Sept. 13, 1966 L. R. MURPHY 3,272,269
VEHICLE-WEIGHING SCALE WITH DECK UNIT WHICH
MAY BE DISMANTLED FOR TRANSPORTATION
Filed Oct. 20, 1965 4 Sheets-Sheet 1
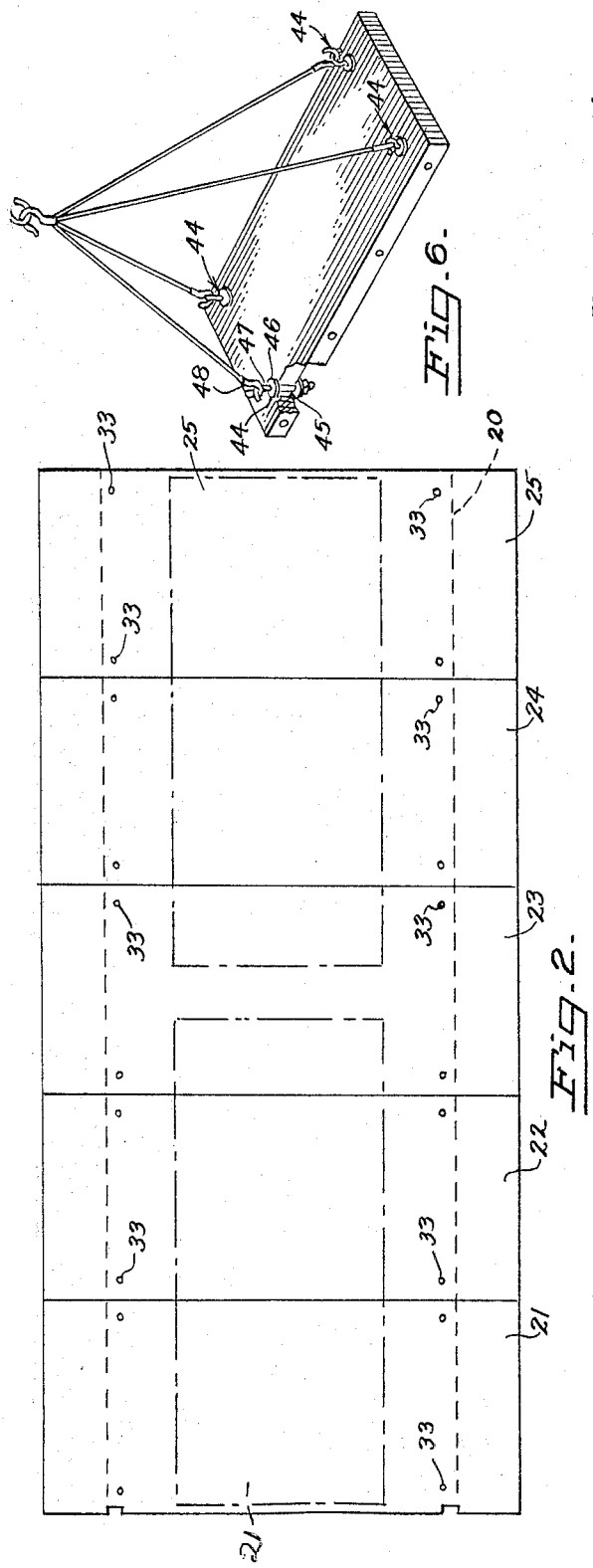
INVENTOR.
LESLIE R. MURPHY
BY
Owen, Wickersham & Erickson
ATTORNEYS

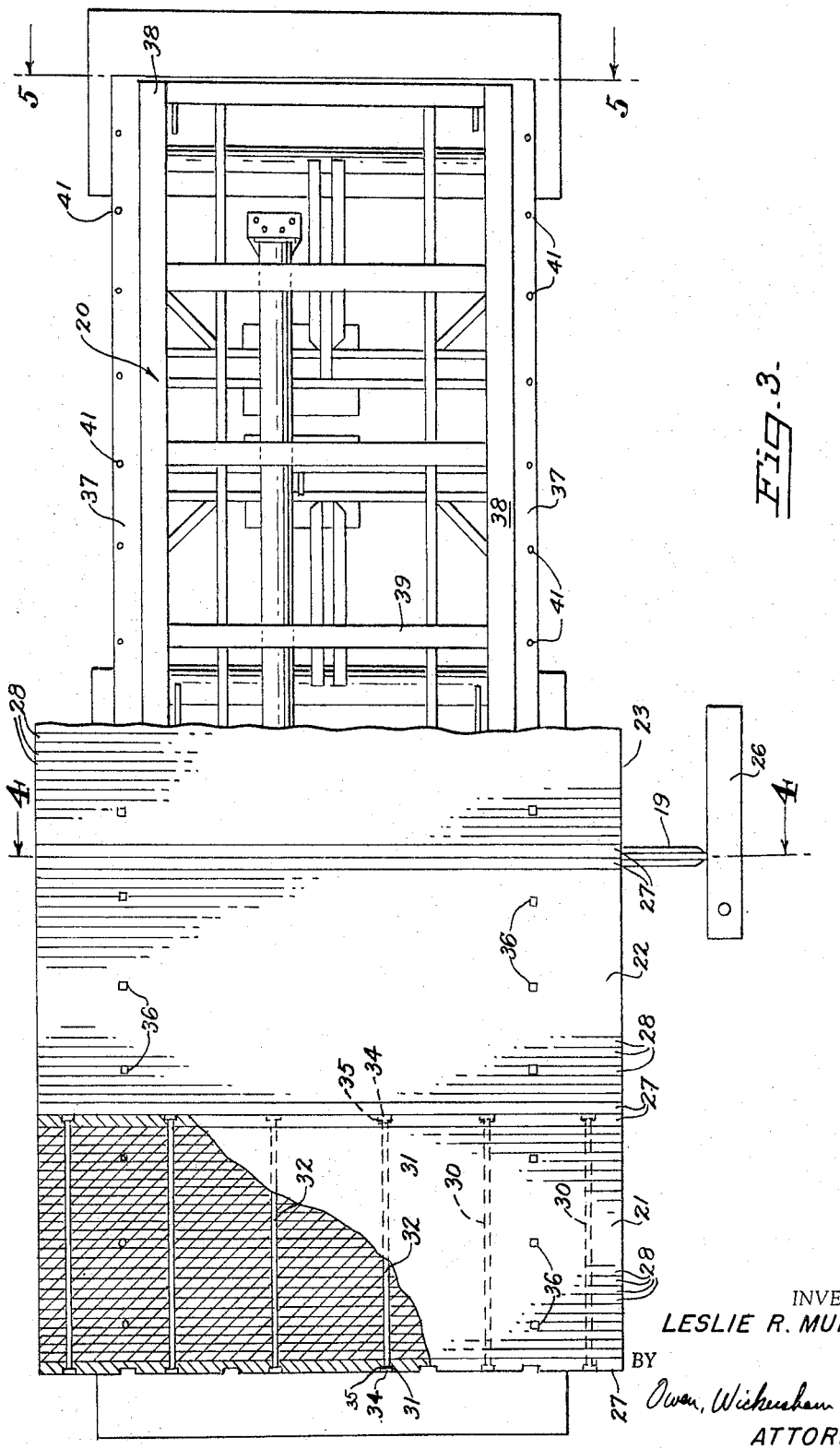

Sept. 13, 1966  L. R. MURPHY  3,272,269
VEHICLE-WEIGHING SCALE WITH DECK UNIT WHICH
MAY BE DISMANTLED FOR TRANSPORTATION
Filed Oct. 20, 1965  4 Sheets-Sheet 3
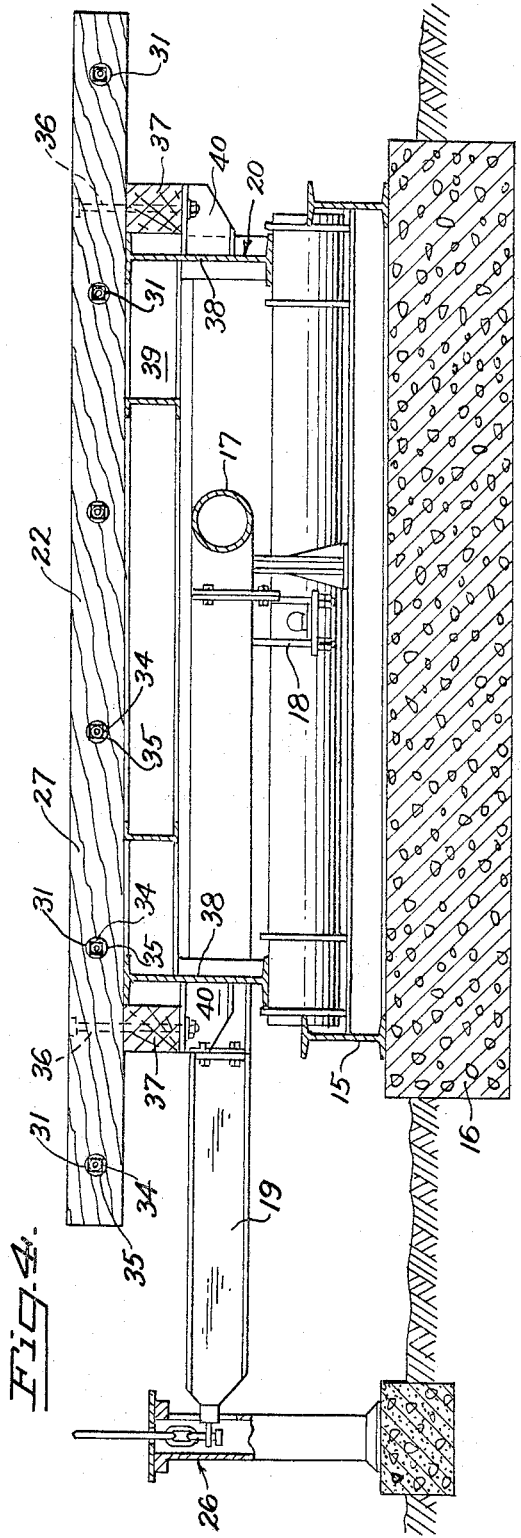
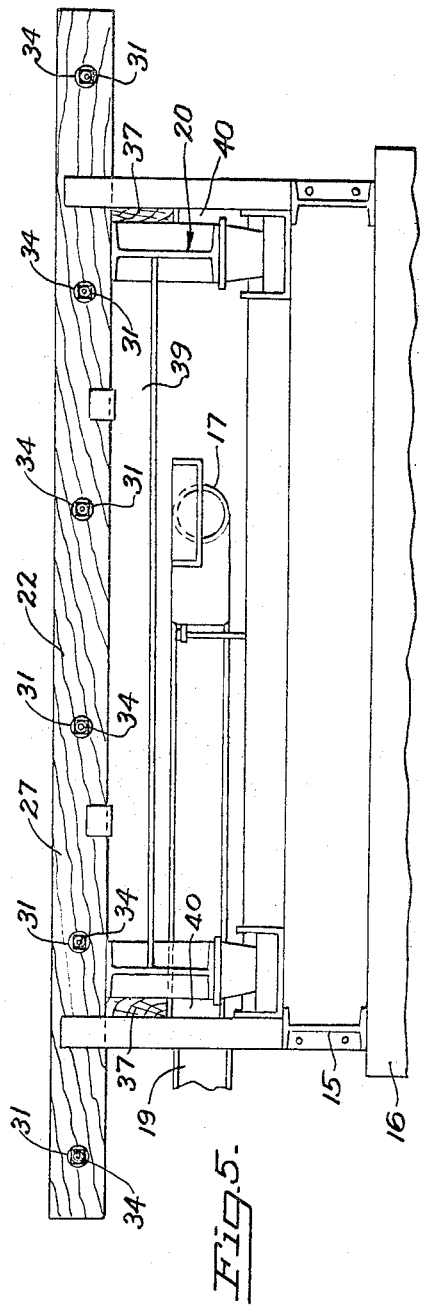
INVENTOR.
LESLIE R. MURPHY
BY
Owen, Wickersham & Erickson
ATTORNEYS Sept. 13, 1966　　　　　　　L. R. MURPHY　　　　　3,272,269
VEHICLE-WEIGHING SCALE WITH DECK UNIT WHICH
　　　　　　　MAY BE DISMANTLED FOR TRANSPORTATION
Filed Oct. 20, 1965　　　　　　　　　　　　　　　4 Sheets-Sheet 4
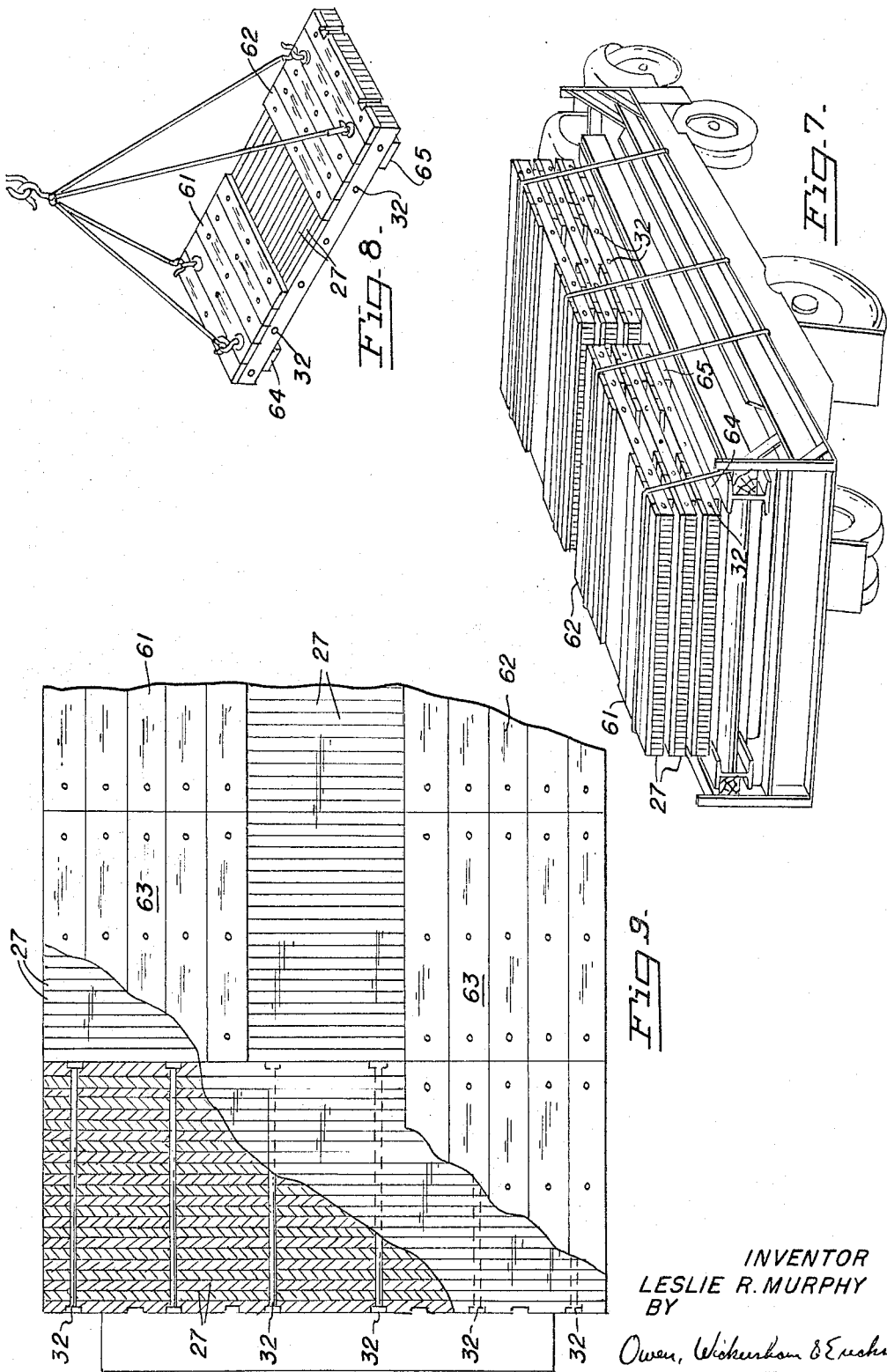
INVENTOR
LESLIE R. MURPHY
BY
Owen, Wickersham & Erickson
ATTORNEYS United States Patent Office 3,272,269
Patented Sept. 13, 1966

3,272,269
VEHICLE-WEIGHING SCALE WITH DECK UNIT WHICH MAY BE DISMANTLED FOR TRANSPORTATION
Leslie R. Murphy, Sacramento, Calif., assignor to L. R. Murphy Scale Company, Sacramento, Calif., a corporation of California
Filed Oct. 20, 1965, Ser. No. 505,583
8 Claims. (Cl. 177—126)

This application is a continuation-in-part of abandoned application Serial Number 360,533, filed April 17, 1964.

This invention relates to improvements in transportable scales for weighing motor trucks, off-the-highway vehicles, and the like; more particularly it relates to the type of transportable scale having a deck whose width can be extended at a weighing station and can be narrowed for highway transport.

Heavy-duty transportable scales are difficult to provide. If a scale is wide enough so that a wide truck, barely within the highway width-limit, can be driven on the scale and weighed, then that scale is obviously wider than the limit. At present, the legal highway width is eight feet, and it is fairly easy to get a permit to move a load no more than ten feet wide; so, many trucks that are ten feet wide are in use, and these have to be weighed when loaded. Moreover, in order to weigh off-the-highway equipment (such as many earth movers, trucks more than ten feet wide, and much road-building equipment) a scale with a deck thirteen to fifteen feet wide is required. In order to get such scales to their destination or to move them from place to place, it is most inconvenient to have the scale width during transportation exceed ten feet, for it is difficult to get permission to move loads wider than ten feet. In most cases scales as wide as twelve feet are out of the question because they are wider than the widest permissible width for highways.

Similar relationships apply to the different specific load widths that are permissible in various states. When scales are transported on rail cars and the like, there is also a standard width that must be maintained. Similar factors have to be considered even when the scales are transported off the highways, for even then they are used for weighing large off-the-highway vehicles as well as the oversize trucks such as those which are used to transport the scales. Also, clearances must be watched. In each case it is desirable to have some way to extend the width of the scale platform when it is used for weighing and to reduce its width when the scale is to be transported.

The width of off-highway vehicles has kept getting still wider, and it has become very difficult to provide scales that are properly extensible and are still movable on the highways themselves. For convenience and safety, the scale deck should be at least two feet wider than the distance between the outside edge of the widest set of tires of the vehicle being weighed. Both the standard timber decks and the metal decks are too light in weight to stand unsupported, and the provision of structurally adequate support members, whether retractable or not, has become quite expensive and difficult in order to obtain the amount of overhang from the normal unextended frame that would be required. The total weight of the scale is also important, for if it is too heavy, it will not be permitted to be moved on the highways. Thus, it has become very difficult to obtain the needed rigidity, strength, size-changing ability, support for the very heavy vehicles, and to avoid considerable expense in overcoming this.

The present invention has solved these problems by providing, in lieu of outrigger extensions or other extending means, a novel form of deck unit which is made from very heavy laminated boards set on edge to provide a very rigid and strong structure and so joined together that it provides a very strong rigid unit. These units are made with each board the length of the extended size of the scale and the boards are built up in lamination to a thickness no wider than the width of the unextensible scale frame for movement along the highway. Thus, the deck sections may be made from 15-foot boards to provide a 15-foot-wide weighing platform, and enough boards may be put side by side to provide a platform section up to ten feet wide, where that is the maximum width permissible on the highway. Of course, the width of the section provided by laminations may be shorter than this maximum permissible width. The weighbridge itself is supplemented by a pair of very heavy timber stringers, such as six-by-eights, which extend the entire length of the scale. The stringers are bored, and bolts are used to secure the laminated scale sections to them when the scale is being used for weighing. When the scale is being transported from place to place, chains or any other desired means may be used for holding the deck sections in place. Thus, great strength, ability to overhang the frame, and to remain rigid when heavy, loaded, off-the-highway vehicles of very wide tread are driven over them, are combined into a relatively inexpensive structure.

Other objects and advantages of the invention will appear from the following description of a preferred embodiment thereof.

In the drawings:

FIG. 1 is a view in perspective of a transportable scale embodying the principles of the present invention, mounted upon a large transport truck, with its scale platform shown stacked in sections in its narrow-width or transporting position.

FIG. 2 is a top plan diagrammatic view of the scale platform of FIG. 1 showing in comparison the widths of the stacked sections in dot-dash lines and the platform in solid lines in weighing position, the weighbridge outline being shown in broken lines.

FIG. 3 is a top plan view of the scale with some portions broken away or removed in order to show structure and some members therebeneath.

FIG. 4 is a view in elevation and in vertical cross-section of the scale of FIG. 1 mounted on the ground and prepared for weighing, taken along the line 4—4 in FIG. 3. The novel laminated platform members are shown now in their extended position overhanging the weighbridge and self-supporting. They are bolted at this time to the stringers.

FIG. 5 is an end elevation view of the same scale taken along the line 5—5 of FIG. 3, with the weighbeam lever broken off.

FIG. 6 is a view in perspective showing how the sections are lifted and moved.

FIG. 7 is a view in perspective similar to FIG. 1 of a modified form of the invention for use with vehicles having high-pressure tires or an exceedingly heavy axle load.

FIG. 8 is a view in perspective of one of the sections of FIG. 7.

FIG. 9 is a top plan fragmentary view of a portion of the scale of FIG. 7 shown on an enlarged scale and with some portions broken away or removed in order to show the structure and members therebeneath.

Although it is transportable, as shown in FIG. 1, the scale of this invention is designed for heavy duty weighing and when set up as shown in FIG. 4, its base 15 is preferably supported on a suitable footing 16. By a suitable suspension system of the type well known in the art and only rudimentarily indicated in the drawings (it includes levers 17, 18 and 19) the base 15 supports a weighbridge 20 on which rests a series of deck runways or platform members 21, 22, 23, 24 and 25. (There may be more or fewer of these units.) The purpose of the deck or platform members 21, 22, 23, 24 and 25 is to provide a surface on which the trucks can be driven when they are to be weighed and to transmit the load evenly to the weighbridge 20. The weighbridge 20, in turn, when depressed by the load, transmits the force through the levers 17, 18 and 19 so as to actuate a suitable lever indicating device 26 shown at the left of FIG. 4 and at the bottom of FIG. 3. There, weighbeams, dial units, or other indicating devices may be supplied.

This invention is concerned chiefly with the connection and cooperation between the weighbridge 20 and the platform members 21, 22, 23, 24 and 25. It also is concerned with the structure of these platform members. There may be two, three, or more of these platform units, five being shown here only as an example. Each unit is made up of a plurality of boards on edge. Preferably, I find that the boards 27 at the end should be four-by-eights (typically approximately four-by-seven and three-eighths inches) and that the boards 28 in between may be two-by-eights (typically approximately one and three-quarter by seven and three-eighths inches). The two-by-eights 28 are used because the more pieces used, the more strength is provided, while on the ends the four-by-eights 27 give enough width to enable counterboring. Instead of two-by-eights, two-by-sixes or two-by-tens and similar sizes may be used, or plywood of comparable height may be used with pressure gluing.

All the boards 27 and 28 are preferably cut the length which is to be the extended width of the scale; for example, if the scale platform units 21, etc. when finished are to be fifteen feet wide, all the boards 27 and 28 are fifteen feet long. The boards 27 and 28 are stood on edge to give more than seven inch depth that provides a great amount of rigidity. Enough boards 27 and 28 are used to give a desirable width, so that the total number of units 21, etc. adds up to the desired length of scale; for example, if the scale is to be thirty feet, five units 21, 22, 23, 24 and 25 may be six feet wide each. Convenient unit sizes are chosen up to the ten-foot width which is permitted by the typical highway law and, depending on what is the widest width permitted by the laws of the state in which the scale is to be used.

The units 21 may be either bolted or glued together or may be both bolted and glued together. For bolting, all the boards 27 and 28 in each unit 21, etc. are bored to provide, in a ten-foot width, at least four holes 30 running through their thickness, and the end boards 27 are provided with counterbores 31. Lamination of the boards 27 and 28 into units is achieved with the aid of long and heavy steel rods 32 with nuts 34 and washers 35 at each end of rod and in counterbore 31 of all end boards 27. The nuts 34 are drawn very tight, to make a very strong lamination. If desired, glue may be provided between the bolted boards 27 and 28 or the boards 27 and 28 may be held together in the unit 21 solely by gluing. As noted earlier, waterproof plywood units may be made, preferably glued under pressure in five-foot sections.

In addition to the lamination bores 30, some boards 28 are bored with holes 33 to receive a series of bolts 36 extending vertically down through the full height of many of the boards 28 to provide means for securing the deck sections 21, etc. to the weighbridge 20. For this purpose, the weighbridge 20 is provided with a pair of heavy stringers 37 such as six-by-eights, which are bolted securely to the weighbridge girders 38, which may be two very strong, heavy I-beams disposed longitudinally of the scale and parallel to each other and connected together at various points by suitable laterally extending steel structural members 39. These stringers 37 are bolted to short suitable I-beam extension members 40 or brackets 40 which are welded to the I-beam 38. The stringers 37 are themselves bored vertically to provide bolt holes 41 and when the scale is in its operating position, the vertical bolts 36 are set into the boards and are fastened to the stringers 37. Preferably, the deck boards 28 are counterbored to receive the heads of the bolts 36 in a sunken position.

Some of the holes 33 are also used to receive lifting devices 44 which are bolted to the deck at the time that the deck sections 21, 22, 23, 24 and 25 are swung 90° between their transporting position and their weighing position or vice versa. These lifting devices 44 comprise a stud bolt 45 secured at the bottom of a strong washer-like ring disc 46, and lugs 47 are welded to the upper edge of the disc 46 and extend upright. Hooks 48 may be inserted into the eyes of the lug 47 to lift the decks 21, etc. from preferably at least four such anchor points, when moving the section from one position to the other.

During transporting, the deck sections 21, 22, 23, 24 and 25 are stacked with the boards 27 and 28 extending longitudinally, so that the width of each unit 21, etc. does not extend beyond the stringers 37. The units may be bolted to the stringers 37, or they may be held by cables, chains, or other suitable holding devices 50. Their weight is such that they will not easily get out of place anyway.

When the scale arrives at the place where it is to be used and is set on its foundation 16, the lifting devices 44 are bolted to each deck section 21, etc. and cables and crane are used to move them by lifting them, guiding them to the desired position along the deck, since they have been stacked on top of each other up to this time, and then turning them 90° so that they come down on a deck at the desired location. The laminated deck sections 21, etc. are then bolted to the stringers 37 and when they are in place the boards 27 and 28 which were formerly longitudinally extending now extend widthwise and overhang the weighbridge 20 by, say, two and one-half feet. This overhang is supported only by the stringers 37 and the bolts 36; still, these laminated deck units 21, etc. are not damaged because of their great strength. They are then ready for use for weighing.

When it is desired to transport the scale again the bolts 36 are taken out, the lifting device 44 is put back in, the laminated sections 21, etc. are turned 90° and stacked on each other, and then the scale is ready to be moved on a highway.

A modified form of the invention is shown in FIGS. 7 through 9. This form of the invention is particularly designed for use with vehicles having high-pressure tires or exceedingly heavy axle loads concentrated on small footprints (tire contact area). On these exceedingly heavy loads, especially when there are high-pressure tires, the truck has an exceedingly small footprint as compared with a low-pressure tire, and so it has a less-well-distributed load.

The boards 27 shrink after manufacture and tend to become loose. Then, under these heavy loads—especially when starting and stopping—the boards tend to rotate relative to the bolts 32, first enlarging the holes for the bolts 32 so that the boards 27 become still looser and soon loosening them so much that they lie over on each other on an angle. This exposes the sharp edges, and the heavy tire loads chew holes into these edges until finally the boards 27 are torn apart. Even if the boards 27 are glued together, these heavy loads soon cause the same dire results.

In the present invention, the integrity of the platforms is preserved by providing a panel 60 with two sets of flat runners 61 and 62 on top of the boards 27 and extending perpendicular to them, each providing a rather wide space for the two treads of the vehicle. The width of the strips enables it to suit the differences in axle width and also the tendency of one driver to drive a little further to the left or right in any one instance. Bolts 63 may be used to secure these runners in place, and additional reinforcing members 64 and 65 are preferably applied, one beneath each side of the platform unit. The runners 61, 62 strengthen the platform considerably, distribute the load more evenly, and take the weave out of the panels caused by the moving vehicle as it rolls over the platform. This has the unexpected and novel effect of holding the platform together quite firmly. It gives considerable reinforcement and can be used wherever desired.

The bottom reinforcing members 64 and 65 lie outside the weighbridge and counter the tendency of the panel edges to rotate downwardly in toward the truck edges, stiffening the panels and distributing much better the forces when heavy loads are exerted on the panel 60.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a highway-transportable scale having a base frame supported weighbridge of permissible width for road transportation and much longer than said width, and a separable deck for said weighbridge the length of said weighbridge and of a required width greater than the permissible width for highway travel so that it overhangs the deck on each side thereof, the improvement wherein said deck comprises a plurality of like side-by-side lengthwise-connected units each of said required width and each having its length shorter than said permissible width, each said deck unit being further divided into individual deck slabs extending across said unit with the length of each said slab being the width of said deck and being much narrower than said unit, said units being stackable one upon the other and secured in end-to-end relation on said weighbridge for road transportation with the scale then being of said permissible width.

2. In a highway-transportable scale for weighing vehicles wider than permissible highway widths and having a base frame and a weighbridge supported on said base frame by a lever system, said weighbridge having longitudinal side members spaced apart so that the overall width of said weighbridge is within the permissible limits for highway widths, the combination therewith of:

a deck made up of a plurality of rectangular units, each unit comprising a laminated series of wooden members placed on edge so that they are higher than they are wide, the length of each said wooden member being the full length of its unit, the units being of identical length and longer than the overall weighbridge width so that when placed transverse to said weighbridge said units overhang said side members a predetermined amount sufficient to enable movement onto said scale of vehicles with wheels wider apart in outside dimension than the distance across said side members, so that such vehicles can then be weighed, said units each being narrower in their other horizontal dimension than said weighbridge, the total of their widths being equal to the length of said weighbridge, the individual width of each said unit comprising the total on-edge widths of said laminated members of each unit, said units during transport being disposed lengthwise of said weighbridge and some of them stacked on others so that then there is no overhang of said units beyond said weighbridge.

3. The combination of claim 2 having a plurality of anchor means removably secured to each said unit, for attachment thereto of lifting means for changing the position of said unit from transverse to lengthwise and vice versa.

4. The combination of claim 2 wherein each said deck unit also has a plurality of flat top boards secured on top of said unit and providing a pair of separated wheel tracks, said flat boards extending perpendicular to said wooden members and widthwise of said units, so that when said units are installed to provide the overhanging deck, said boards lie in the direction of movement of the vehicle wheels, whereby said wooden members are protected from tilting and ultimate destruction due thereto.

5. The combination of claim 4 wherein there are bottom boards parallel to said top boards on the bottom surface of said unit only on the portion which overhangs said weighbridge when installed.

6. In a highway-transportable scale for weighing vehicles wider than permissible highway widths and having a base frame and a weighbridge supported on said base frame by a lever system, said weighbridge having longitudinal side members spaced apart so that the overall width of said weighbridge is within the permissible limits for highway widths, the combination therewith of:

a deck made up of a plurality of rectangular units, each unit comprising a series of on-edge laminated wooden members whose height is more than twice their width, a series of bolt means extending the full width of each said unit and holding said wooden members together, each wooden member extending the full length of its said unit, all said units being of identical length and longer than the overall weighbridge width, said units during weighing being secured to said weighbridge transverse thereto and successively covering the full length thereof and overhanging said side members a substantial amount to enable movement onto said scale of vehicles with wheels wider apart in outside dimension than said side members, each said unit being narrower in its other horizontal dimension than the width of said weighbridge and comprising the total on-edge widths of said laminated members of that said unit, the total of the widths of said units being equal to the length of said weighbridge, said units being disposed lengthwise of said weighbridge during transport and stacked so that then said units do not overhang said weighbridge.

7. In a highway-transportable scale for weighing vehicles wider than permissible highway widths and having a base frame and a weighbridge supported on said base frame by a lever system, said weighbridge having longitudinal side members spaced apart so that the overall width of said weighbridge is within the permissible limits for highway widths, the combination therewith of:

a deck made up of a plurality of rectangular units of identical length longer than the overall weighbridge width, said units during weighing being secured to said weighbridge transverse thereto and successively covering the full length thereof and overhanging said side members a substantial amount to enable movement onto said scale of vehicles with wheels substantially wider apart in outside dimension than said side members, said units each being narrower in their other horizontal dimension than the width of said weighbridge with the total of their widths equaling the length of said weighbridge, said units being disposed lengthwise of said weighbridge during transport and stacked so that then said units do not overhang said weighbridge, each said unit comprising a series of on-edge wooden members laminated together, the height of each said wooden member being at least twice its width and the length being the full length of said unit, a series of bolts extending the full width of each said unit for holding said wooden members together, and a series of flat top boards secured to the upper surface of said wooden members and lying in a direction perpendicular thereto to provide two parallel roadway strips for vehicle wheels and to prevent disruptive action on said wooden members by highly loaded wheels.

8. The combination of claim 7 wherein each said unit also has bottom boards secured to the bottom surface of said wooden members only at the area where said unit overhangs the weighbridge during installation, said bottom boards lying in a direction perpendicular to said wooden members and parallel to said top boards.

References Cited by the Examiner

UNITED STATES PATENTS

| | | | |
|---|---|---|---|
| 1,648,431 | 11/1927 | Warmoth et al. | 14—73 |
| 2,904,849 | 9/1959 | Bergstrom | 52—143 XR |
| 3,021,544 | 2/1962 | Gillois et al. | 14—27 |
| 3,043,386 | 7/1963 | Marion et al. | 177—126 |
| 3,167,141 | 1/1965 | Murphy | 177—126 |

RICHARD B. WILKINSON, *Primary Examiner.*